United States Patent [19]
Islam

[11] Patent Number: 5,796,909
[45] Date of Patent: Aug. 18, 1998

[54] ALL-FIBER, HIGH-SENSITIVITY, NEAR-FIELD OPTICAL MICROSCOPY INSTRUMENT EMPLOYING GUIDED WAVE LIGHT COLLECTOR AND SPECIMEN SUPPORT

[76] Inventor: Mohammed N. Islam, 2717 Holyoke La., Ann Arbor, Mich. 48103

[21] Appl. No.: 601,600

[22] Filed: Feb. 14, 1996

[51] Int. Cl.$^6$ .................................................. G02B 6/00
[52] U.S. Cl. ............................................................ 385/147
[58] Field of Search .............................. 385/31, 38, 88, 385/85, 89, 133, 115, 116, 117, 120, 126, 147, 900; 250/227.11, 227.2, 227.14, 227.18, 573, 577, 234, 216, 306, 226

[56] References Cited

U.S. PATENT DOCUMENTS

| | | |
|---|---|---|
| 4,604,520 | 8/1986 | Pohl . |
| 4,725,727 | 2/1988 | Harder et al. . |
| 4,917,462 | 4/1990 | Lewis et al. . |
| 5,018,865 | 5/1991 | Ferrell et al. . |
| 5,105,305 | 4/1992 | Betzig et al. . |
| 5,138,159 | 8/1992 | Takase et al. . |
| 5,168,538 | 12/1992 | Gillespie . |
| 5,254,854 | 10/1993 | Betzig . |
| 5,272,330 | 12/1993 | Betzig et al. . |
| 5,286,970 | 2/1994 | Betzig et al. . |
| 5,286,971 | 2/1994 | Betzig et al. . |
| 5,288,996 | 2/1994 | Betzig et al. . |
| 5,288,997 | 2/1994 | Betzig et al. . |
| 5,288,998 | 2/1994 | Betzig et al. . |
| 5,288,999 | 2/1994 | Betzig et al. . |
| 5,361,314 | 11/1994 | Kopelman et al. . |
| 5,394,500 | 2/1995 | Marchman . |
| 5,395,741 | 3/1995 | Marchman . |
| 5,402,508 | 3/1995 | O'Rourke et al. . |
| 5,452,382 | 9/1995 | Shionoya et al. . |
| 5,485,536 | 1/1996 | Islam . |
| 5,548,113 | 8/1996 | Goldberg et al. . |

OTHER PUBLICATIONS

Reddick, R.C. et al., "New Form of Scanning Optical Microscopy" *Physical Review B*, vol. 39, No. 1, Jan. 1, 1989, pp. 767–770.

Corcoran, Elizabeth, "A Thin Line," *Scientific American*, Aug. 1990, pp. 98–100.

Reddick, R.C. et al., "Photon Scanning Tunneling Microscopy," *Rev. Sci. Instrum.*, vol. 61, No. 12, Dec. 1990, pp. 3669–3677.

Ferrell, T.L. et al., "Progress in Photon Scanning Tunneling Microscopy (PSTM)," *Ultramicroscopy*, vol. 42, No. 44, 1992, pp. 408–415.

Pangaribuan, Togar et al., "Reproducible Fabrication Technique of Nanometric Tip Diameter Fiber Probe for Photon Scanning Tunneling Microscope," *Jpn J. Appl. Phys.*, vol. 31, 1992, pp. L1302–L1304, Sep. 1, 1992.

(List continued on next page.)

*Primary Examiner*—Akm E. Ullah
*Attorney, Agent, or Firm*—Harness, Dickey & Pierce, P.L.C.

[57] ABSTRACT

This invention relates to a novel, all-fiber near-field scanning optical microscope (NSOM) that can have substantially improved sensitivity and signal-to-noise ratio (SNR) over the conventional NSOM design. The main advance for the all-fiber high-SNR NSOM is the use of a cleaved, flat-top fiber for collecting the light below a NSOM fiber probe with a tapered tip. The collecting fiber can be either a single-mode or a multi-mode fiber. The sample is mounted on one end of the collecting fiber, while the other end is directly coupled to a light detector. The use of fibers for both delivering and collecting light improves the sensitivity and SNR because the receiving fiber acts both as a position and angle filter, and the light is collected immediately after the sample. Moreover, for long and thin samples, the collecting fiber may be replaced by a planar waveguide structure such as a slab glass or semiconductor waveguide. This guided wave collection NSOM design can lead to a compact, lightweight, ultra-rapid and agile instrument. The resulting instrument will be particularly attractive for applications in military field deployment and bio-medical diagnostics instruments. Also, the low thermal mass and compact NSOM head will be easily amenable to aqueous or cryogenic applications for the instrument.

22 Claims, 4 Drawing Sheets

OTHER PUBLICATIONS

Markoff, John, "I.B.M. Crammed With Data," *The New York Times*, Jun. 2, 1993.

Van Labeke, D. et al., "Probes for Scanning Tunneling Optical Microscopy: A Theoretical Comparison," *J. Opt. Soc. Am. A.*, vol. 10, No. 10, Oct. 1993, pp. 2193–2201.

Pangaribuan, Togar et al., "Highly Controllable Fabrication of Fiber Probe for Photon Scanning Tunneling Microscope," *Scanning*, vol. 16, 1994, pp. 362–367.

Bylinsky, Gene, "Genetics The Money Rush Is On," *Fortune*, May 30, 1994, pp. 94–108.

Corcoran, Elizabeth, "Storage Space," *Scientific American*, Oct. 1992, pp. 110–112.

ALL-FIBER, HIGH-SENSITIVITY, NEAR-FIELD OPTICAL MICROSCOPY INSTRUMENT EMPLOYING GUIDED WAVE LIGHT COLLECTOR AND SPECIMEN SUPPORT

BACKGROUND AND SUMMARY OF THE INVENTION

The present invention relates generally to near field optical microscopy (NSOM). More particularly, the invention relates to an improved, all-fiber NSOM instrument that can have substantially improved sensitivity and signal-to-noise ratio (SNR) over the conventional NSOM design. Much of the bulk optics used in conventional NSOM's for collecting the light is replaced in the current invention by a guided-wave structure such as a single-mode or multi-mode optical fiber or a slab planar waveguide.

The conventional compound microscope, now ubiquitous in the research laboratory, relies on illuminating the specimen by an external light source and using lenses in the far field to gather and focus the light. The far field corresponds to a specimen-lens distance of many optical wavelengths. There is, however, a limit to the resolving power of the conventional compound microscope. A physical phenomenon known as the diffraction limit prevents far field optical systems from resolving images smaller than roughly one-half the optical wavelength.

In 1928 Synge suggested that optical microscopy could overcome the diffraction limit of light by abandoning the far field and instead working in the near field. The near field exists in close proximity to the specimen, less than one optical wavelength. Using a tiny aperture and placing that aperture in the near field of the specimen, optical microscopy can achieve significantly greater resolving power. According to Synge's suggestion, the specimen is placed in the near field of the aperture, and light is delivered through the aperture so that it impinges upon and is reflected from or transmitted through the specimen. The reflected or transmitted light is then collected and viewed with a conventional optical microscope. In this way, only a tiny portion of the specimen is illuminated, hence all of the light entering the optical microscope corresponds to a single microscopic feature. This technique is thus capable of producing higher resolution than conventional optical microscopes.

A number of different implementations of Synge's idea have been experimented with. Pohl suggested that optical implementations could be achieved by coating the tip of a prism-like crystal. The first successful optical near field demonstration was by a group at Cornell which "taffy-pulled" glass micropipettes down to sub-wavelength diameters and defined the aperture by metallic overcoats. The taffy-pulled micropipette was highly inefficient, because the sub-wavelength diameter of the pipette choked off virtually all of the light, so that very little light would exit through the aperture to impinge upon the specimen.

Betzig and coworkers at AT&T Bell labs improved upon the Cornell taffy-pulled micropipette by replacing the glass micropipette with a fiber optic cable. Using the fiber optic cable Betzig and coworkers increased efficiency by three or four orders of magnitude. The Betzig device is manufactured by heating the fiber optic cable and then taffy-pulling it to sub-wavelength diameter, followed by a metallic overcoat.

While the Betzig device improves efficiency, a fundamental problem still remains. Although light will propagate efficiently down a fiber optic cable of standard diameter, the light becomes choked off when the diameter is reduced beyond a certain dimension. This is because light propagates in a waveguide-like fashion in the fiber optic cable of standard diameter. Specifically, light is confined to the inner core of the fiber optic cable by total internal reflection at the inner core-outer cladding boundary. When confined to the inner core in this fashion, light is said to be in the propagating mode.

It is a physical consequence of the taffy-pulling technique that the stretched fiber optic cable gets to be quite long before the diameter of the inner core becomes reduced sufficiently to form the aperture. Thus when a fiber optic cable is taffy-pulled to an extremely small aperture, the evanescent mode region is very long and efficiency is very poor. For example, a near field optical microscope (NSOM) with a resolution of 1000 Å has an efficiency at best of roughly $2 \times 10^{-4}$; by comparison, a NSOM with a resolution of 250 Å has an efficiency of typically less than $1 \times 10^{-6}$. The resolution plummets even further for smaller resolutions.

This degradation in resolution has significant consequences. Although extremely small apertures can be produced by taffy-pulling, the resulting efficiency is so low that virtually no usable light reaches the aperture and the specimen is not illuminated brightly enough to obtain a useful image.

Islam overcomes the efficiency degradation problem by providing a light-emitting probe which has a rapidly tapered tip that protrudes longitudinally outwardly from the outer cladding of the fiber optic cable. The tapered tip comprises a portion of the inner core of the fiber optic cable. By extending the inner core longitudinally outwardly from the outer cladding, a very rapid taper can be fabricated by wet chemical etching. Because the inner core is rapidly tapered, light propagating along the inner core spends very little time in the evanescent mode before reaching the aperture. Therefore substantially more optical energy is delivered through the aperture to impinge upon the specimen.

Islam also shows that when extremely high resolution is desired, an alternate embodiment of fiber-optic employs a dual portion tip comprising a reduced diameter intermediate region and a pointed tip that extends longitudinally beyond the outer cladding of the intermediate region. The intermediate region may be formed with a gradual taper, as by taffy-pulling, and the pointed tip may be formed by chemical etching. Significantly, the intermediate region is configured with its gradually tapering diameter so that light propagating in the intermediate region does so in a guided wave mode. Light propagating in the pointed tip propagates in an evanescent mode, preferably for fewer than five optical wavelengths.

Thus, considerable attention has been focused on improving the efficiency and resolution of NSOM instruments through proper fiber-optic probe designs. However, very little attention has been devoted to the loss in sensitivity due to the conventional bulky optical components used to collect the light after the sample. Improvements in the fiber-optic probes can lead to higher efficiency and resolution, while improving the collection optics in the microscope can lead to higher sensitivity and SNR.

For example, consider the commonly employed NSOM instrument design where light is transmitted through the sample to be tested. The transmitted light passes through the microscope slide on which the sample is placed and is collected with a high numerical aperture (NA) lens, and then the collected light is directed to a photomultiplier tube or an avalanche photodiode. Thus, the current NSOM design involves considerable amount of bulk optics, and the efficiency of collecting the transmitted light may be poor since the light emanating from the probe is in a large solid angle and there are many surfaces that can lead to reflection losses. Also, the SNR may be degraded by pick-up of stray or scattered light.

The present invention overcomes the loss in sensitivity problem by using a single-mode or multi-mode fiber for collecting the light after the sample. Alternately, for long thin samples a planar waveguide can be employed for the collection. In particular, the top half of the all-fiber NSOM is identical to before, but the bottom half is replaced with a compact, guided-wave design. The sample is placed directly onto the cleaved, flat-top of a fiber-optic cable. One end of the cable serves to hold the sample and collect the light, while the other end is coupled directly to the detection system. The use of fibers for both delivering and collecting light improves the sensitivity and SNR because the receiving fiber acts both as a position and angle filter and the light is collected immediately after the sample.

There are numerous applications where the high sensitivity and lightweight all-fiber NSOM invention will be invaluable. These include, materials characterization, super high density magneto-optical memory, optical lithography and bio-medical imaging. In addition, the novel design can be integrated into a compact, lightweight, cost-effective device with rapid scanning capabilities that would be particularly suitable for field deployment or diagnostics instrumentation. This would be important in the bio-medical diagnostics for clinical applications and for military applications requiring field-deployable devices. Also, the low thermal mass and compact NSOM head will be easily amenable to aqueous or cryogenic applications for the instrument.

For a more complete understanding of the invention in the all-fiber, lightweight, high sensitivity and signal-to-noise ratio forms, reference may be had to the following specification and to the accompanying drawings.

DETAILED DESCRIPTION OF THE PREFERRED EMBODIMENT

Figure 2:
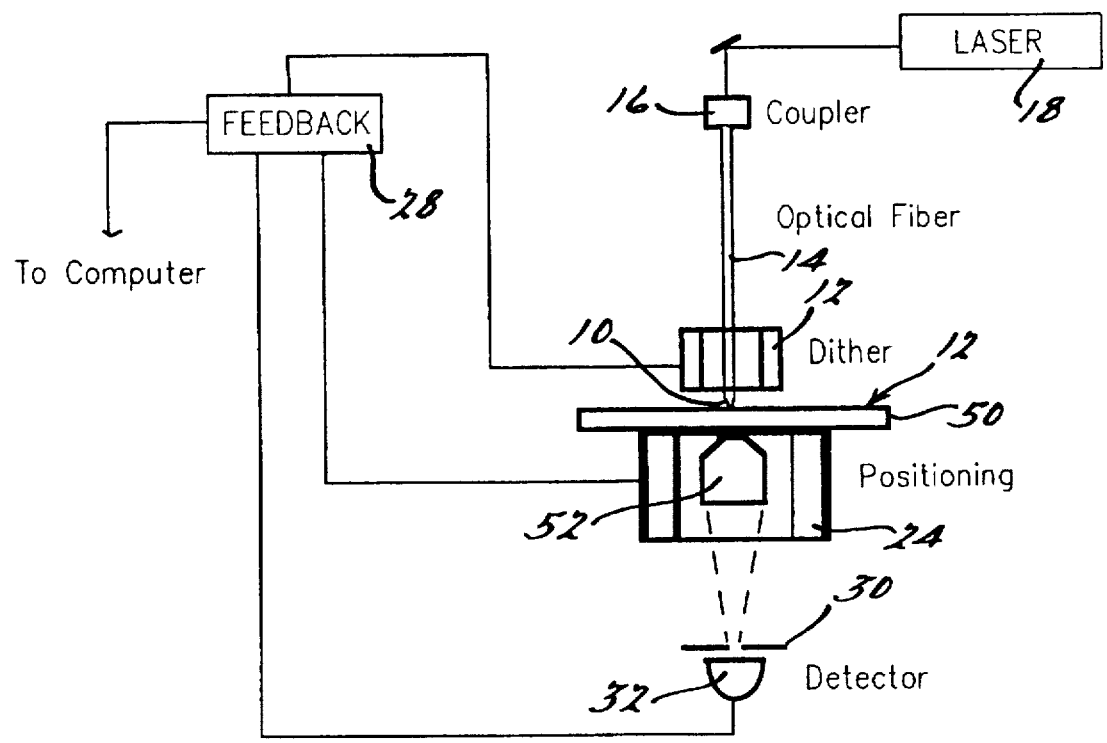
FIG. 2 is a diagrammatic illustration of a prior art NSOM configuration where the light is transmitted through the sample placed on a microscope slide and collected by bulk optical lens and directed to a detection system.

Consider the current design of an NSOM instrument used in transmission mode, as shown in FIG. 2. Light from a laser 18 is coupled 16 into the fiber-optic probe 14, which delivers photons through the tip 10 to the sample 20 placed in the near field. The probe is dithered 12 for shear-force positioning feedback, and the sample 20 placed on a microscope slide 50 is positioned 24 using piezo-electric transducers (PZT's). The transmitted light passes through the microscope slide 50 and is collected with a high numerical aperture (NA) lens or microscope objective 52, and then the collected light is directed to a photomultiplier tube or an avalanche photodiode 32. Thus, the current NSOM design involves considerable amount of bulk optics, and the efficiency of collecting the transmitted light may be poor since the light emanating from the probe is in a large solid angle and there are many surfaces that can lead to reflection losses. Also, the SNR may be degraded by pick-up of stray or scattered light.

Figure 1:
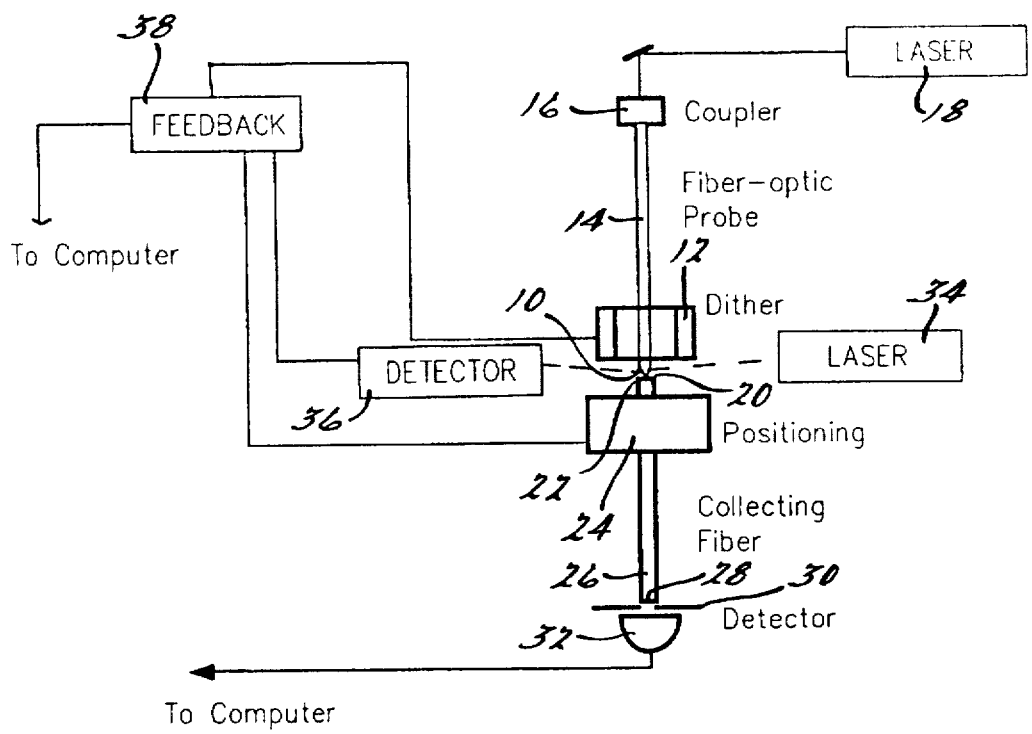
FIG. 1 is a diagrammatic illustration of the all-fiber NSOM instrument of the invention, including a detailed enlargement of the probe tip, sample and collecting fiber to show the details thereof.
Figure 1:
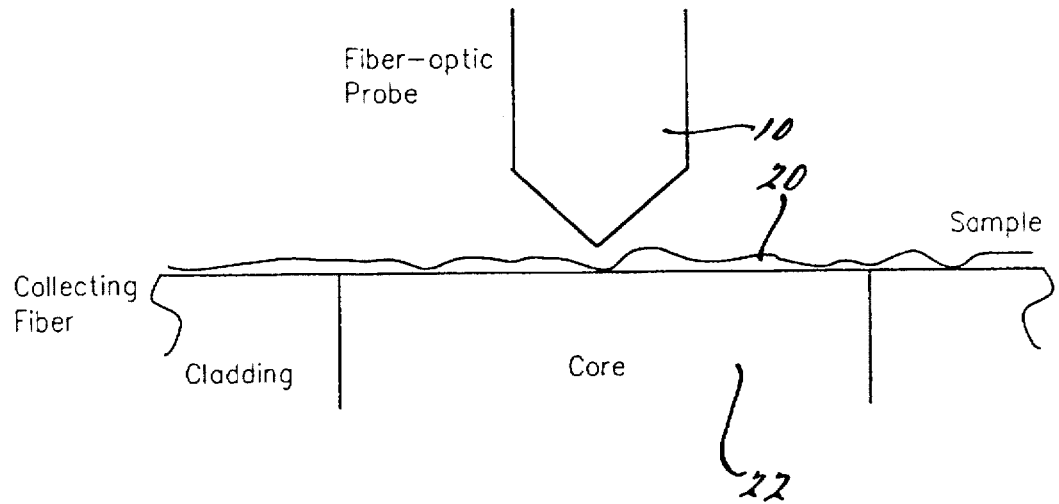

FIG. 1 shows the proposed high-SNR NSOM design. The top half of the NSOM is identical to before, but the bottom half is replaced with a compact, fiber design 26. The sample 20 is placed directly onto the cleaved, flat-top 22 of a fiber-optic cable 26. One end of the cable 22 serves to hold the sample 20 and collect the light, while the other end 28 is coupled directly to the detection system 30,32. The top fiber probe 14 is dithered 12 for shear-force feedback, and the collecting fiber 26 is fitted into a 3-D PZT positioner 24 for placement in the near-field of the probe. Note that the collecting fiber 26 on the bottom side should be sufficiently long (typically>1 m) to strip-out the cladding modes, leaving only the light guided in the fiber core.

The feedback system in this all-fiber NSOM would be similar the feedback system used for reflection-mode NSOMs. Namely, a probe 14 is illuminated by a laser 34 from the side, and a detector 36 is placed on the other side to measure the displacement of the probe as it approaches the sample. In this shear-force sensing scheme, the probe is dithered at its resonant frequency, and the magnitude of the dither decreases precipitously as the probe approaches the sample. Thus, the positioning feedback system in the NSOM also provides topological mapping of the sample surface.

Figure 3:
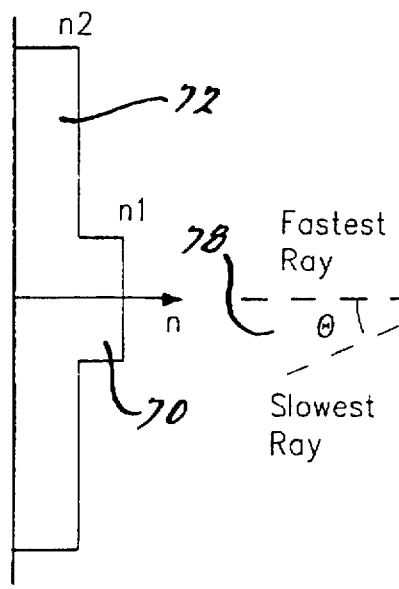
FIG. 3 is an illustration of the slowest and fastest rays supported by a step-index fiber. The index profile of the exemplary fiber is shown on the left hand side, while the rays in the fiber optic cable are shown on the right.
Figure 3:
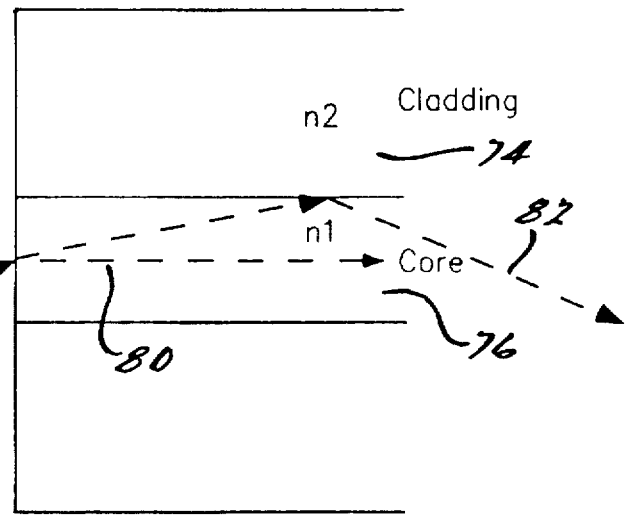

The key to this high-sensitivity NSOM design is the angle and position specificity of guided-wave structures such as the fiber-optic cables 26. Consider a simple step-index fiber, which consists of a core 76 with an index-of-refraction $n_1$ (70) and a cladding 74 of index $n_2$ (72). Typical dimensions of the single-mode core is between 2–8 μm diameter and for the cladding is about 125 μm. For a multi-mode fiber the core size is typically between 50–100 μm diameter, although "light-pipes" as large at 1000 μm are also available. Light is guided in the fiber by the principle of total internal reflection (TIR), which requires that the core index 70 always exceed the cladding index 72 ($n_1>n_2$). Also, the angle of the incident light must lie within a cone angle $2\phi$ (78), which is related to the fiber numerical aperture NA by (FIG. 3)

$$NA = \sin\phi = sqrt\{n_1^2 - n_2^2\}.$$

In the table below are listed some high-NA fibers that would be particularly advantageous for collecting the light.

TABLE 1

Exemplary fibers that may be appropriate for collecting light in the NSOM.

| Fiber Description | Numerical Aperture (NA) | Total Cone Angle (2ø) | Core Diameter (μm) |
|---|---|---|---|
| Single Mode Fiber | | | |
| 3M Commercial Fiber | 0.24 | 30° | 3 μm |
| Corning Experimental Fiber | 0.36–0.39 | 42–46° | 3–3.4 μm |
| Fujikura Fiber (Ohtsu experiments) | 0.32 | 37° | 3.4 μm |
| Multi Mode Fiber | | | |
| Corning Commercial MM Fiber | 0.29 | 34° | 100 μm |
| Newport Commercial MM Fiber | 0.37 | 43° | 600 μm |

Figure 4:
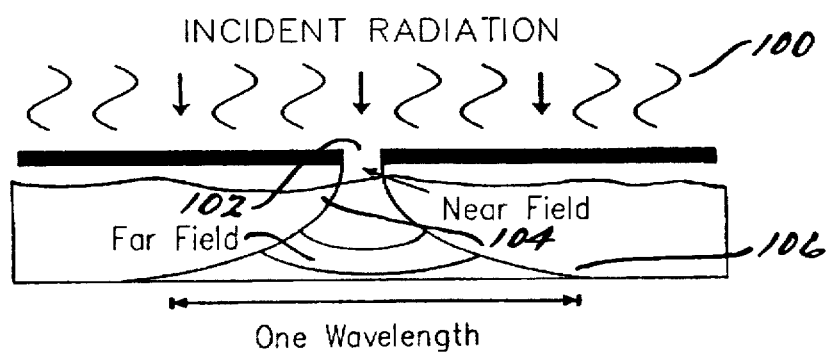
FIG. 4 is an illustration of the fundamental principle underlying NSOM systems. Light in the near-field of the aperture is nearly collimated, while in the far field the light diffracts rapidly.

The angle sensitivity is particularly useful for the case of near-field optics. Consider the simple case of light transmission through a small aperture, as shown in FIG. 4. For an aperture 102 of radius r, the near field 104 extends approximately for a distance in the z-direction of $$d=(\pi r^2)/\lambda,$$

where λ is the wavelength of light. Over this distance the light is roughly collimated, while beyond this distance the light diffracts rapidly 106 with a cone angle of approximately (λ/r) radians. Therefore, for a small aperture with dimensions much smaller than the wavelength of light, the diffraction angle can be quite large, and only the nearly collimated light of the near field will be accepted by the collecting fiber. Actually, for r<<λ the probe tip acts as a point source that radiates omnidirectionally.

Thus, the collecting fiber acts as a position filter, collecting light only over the core area 76. In addition, the collecting fiber serves as an angle filter 78 so long as the fiber length is sufficient to strip-out the cladding modes. This filtering along with the placement of the collecting fiber 22 immediately below the sample 20 are both crucial for achieving the improvements in SNR compared with conventional NSOM designs. The light transmitted through the sample is directly collected while much of the unwanted scattered or stray light is blocked. Therefore, the improvements in fiber-optic probes lead to high-efficiency and resolution for light delivery, while the fiber collection microscope leads to high-sensitivity and SNR. Equally important is that the all-fiber design can result in a compact, lightweight NSOM that is particularly amenable for field-deployment or diagnostic instruments.

Advantages of Proposed Design

This innovative all-fiber NSOM design can lead to higher sensitivity and SNR compared with the conventional NSOM for several reasons. First, the angle 78 and position 76 filtering provided by the collecting fiber 26 can help to reject much of the unwanted stray and scattered light that contribute to a noise background. Second, the light collection may be more efficient because the light is collected 22 right after the sample 20, rather than having to pass through a microscope slide 50 and the working distance of a bulk lens 52 as in a conventional NSOM. Also, the fiber-optic cable 26 avoids the reflection losses and misalignments inherent to the bulk optics 50,52 used in the conventional NSOM design. Finally, the distal end 30 of the collecting fiber 26 can be conveniently coupled to a detector 32 while rejecting pick-up from room lights and scattered light.

The all-fiber construction of this NSOM design can lead to a compact, lightweight, ultra-rapid and agile instrument.

The fiber-optic collection system will be much lighter than the bulk lens 52 and mirrors used in the conventional NSOM, and the heart of the NSOM instrument will be as thin as a strand of hair. The small mass of the fiber 26 can also result in a much faster mechanical feedback system for positioning 24 and scanning. The cost of the instrument may also be reduced, since much of the bulk optics 50,52 will be replaced with fibers 26. The resulting instrument will be particularly attractive for applications in military field deployment and bio-medical diagnostics instruments. Also, the low thermal mass and compact NSOM head will be easily amenable to aqueous or cryogenic applications for the instrument.

This innovative NSOM design may also relax some of the metallic coating and aperture forming requirements on the fiber-optic probes 10 used for light delivery. Because of the angle and spatial filtering, much of the stray light from the cladding or sides of the fiber-optic probes will be rejected by the collecting fiber. Further modeling will be required to determine the degree to which the coating requirements can be reduced without contributing to a large noise background. Since the metal coating and aperture forming are the most expensive and time-consuming steps for the fiber-optic probe 10 fabrication, desensitizing the instrument to imperfections in the coating can be a significant simplification in the NSOM probe market.

Moreover, since the fibers 22 are made of glass just like microscope slides 50, all the same sample preparation techniques can be used for placing the sample on the cleaved collecting fiber 22 as in a conventional NSOM. With regard to biological or genetic materials, the resulting instrument may be particularly advantageous for samples with fluorescent probes. When excited by light from the fiber-optic probe 10, the fluorophores radiate incoherent light omnidirectionally. A larger fraction of the fluorescence may be captured by collecting fiber 22 placed directly below the sample 20. Also, when placed in aqueous solution, the higher index of the solution (typically n~1.33–1.5) will increase the NA of the fiber to NA=n sin φ, thus increasing the collection angle.

In summary, the combination of the high-efficiency and resolution fiber-optic probes and the high-sensitivity and SNR all-fiber NSOM instrument can lead to substantially higher performance for NSO devices. This innovative NSON instrument is well-suited for bio-medical imaging applications with samples labeled with fluorescent tags. Also, the compact, lightweight, cost-effective design is particularly advantageous for clinical applications in diagnostic instruments or military applications requiring field deployable devices.

Potential Challenges & Alternate Guided-Wave Schemes

Although the rejection of noise would increase the sensitivity of the NSO instrument with fiber collection 22, the bulk lenses 52 may be able to collect more of the light, thereby increasing the signal level. Consider a source that radiates approximately into a hemisphere of radius r whose volume is $$V=2\pi r^3/3.$$

The volume of the one of light collected by the lens or fiber is given approximately by $$V=\pi r^3(NA)^2/3.$$

Thus, the fraction of light collected by the lens is given by $$\eta=(NA)^2/2.$$

Because of the squared dependence of the collection efficiency on NA, the desire is to increase NA to the extent possible. The fibers listed in Table 1 are representative of high-NA fibers that are available for application in the NSQM instrument. On the other hand, a 40X lens that is typically used in NSOM instruments set-up (FIG. 2) has a value of NA=0.65. Therefore, if the Corning experimental fiber with NA=0.36 is used, the capture efficiency decreases over the 40X lens by $(0.36/0.65)^2=0.31$. However, there are other losses in the bulk set-up that need also to be accounted for. For instance, if the lens is not anti-reflection coated and there are six glass surfaces on the microscope objective 52 as well as two on the microscope slide 50 and perhaps a turning mirror to the detector, the reflection loss alone is approximately 35%. In addition, aperturing within the microscope objective 52 often introduces about 10% transmission loss as well as any losses associated with misalignments of the optics.

One restriction for the new NSOM design is that the sample must be located over the core of the fiber, which has a diameter on the order of 5 μm for single-mode fiber and about 100 μm for multi-mode fiber. This may increase the complexity of sample preparation and initial microscope alignment. Since the typical NSOM scan is over 200×200 nm, the 5,000 to 100,000 nm diameter should not be overly restrictive so long as the region of interest on the sample is over the core. To ease the restrictions on sample preparation, it would appear that multi-mode fibers for collection would be more desirable. However, multi-mode fibers are currently avoided in the fiber-optic probes because of noise introduced from beating between different modes. Similarly, the use multi-mode fibers in the collection may experience mode-beating difficulties. The mode beating can be minimized by using a single spatial mode laser 18 and not disturbing the collection fiber 26 during NSOM instrument operation.

With respect to the initial alignment difficulties, it should be pointed out that commercial instruments align the cores of two fibers with little difficulty. For example, fiber splicers align the cores of two fibers and then are weld the fibers together. These instruments actually align the fibers' outside cladding diameters, which are typically 125 μm or larger and which can be easily observed under a conventional optical microscope. The trick is that the fibers must be made so the core and cladding are concentric so that the alignment of the cladding automatically guarantees coincidence of the cores. Most commercial fibers have a high degree of concentricity of the core and cladding.

Figure 5:
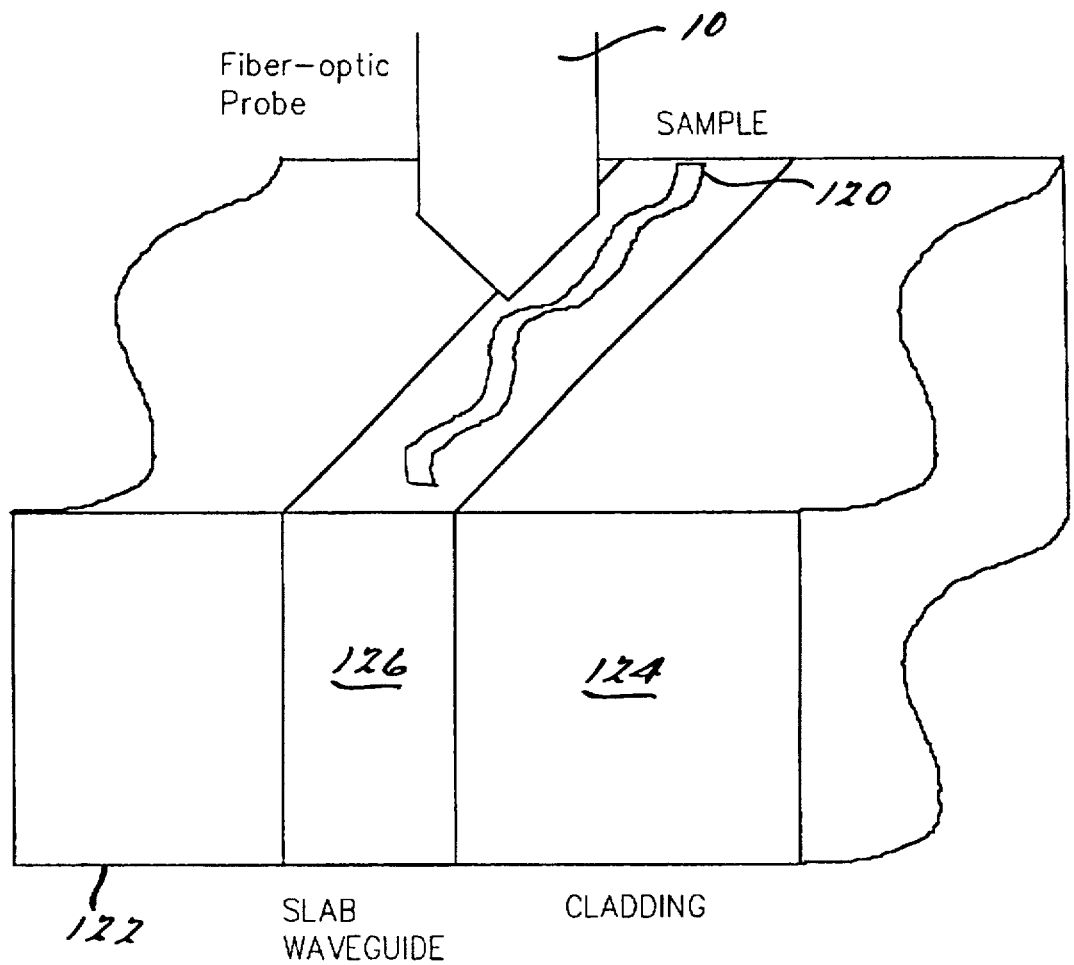
FIG. 5 illustrates one embodiment of the NSOM collecting system where a planar slab waveguide structure may be used instead of a cylindrical fiber for NSOM applications requiring scanning down a long thin sample.

Another difficulty arises if the desire is to scan down the length of a long thin sample 120. For example, for sequencing of DNA the instrument would have to scan down a ~400 μm length of DNA strand, much like a train going down a track. This application would require multi-mode collection fibers such as those included in Table 1, provided that the mode beating noises are minimized. An alternative may be to replace the collecting fiber 26 with a slab waveguide 122 made either in glass or semiconductor (FIG. 5). Therefore, the NSOM would still take advantage of the spatial and angle filtering of the guided wave structures, except that the cylindrical fiber geometry 26 is replaced with a planar waveguide device 122. Semiconductor waveguides may be particularly advantageous because they have large NA and because the semiconductor detector may be integrated right below the waveguide structure. This could lead to further reduction in the size and number of parts for the NSOM instrument. The trade-off is the additional complexity in growing and designing the appropriate semiconductor structures.

What is claimed is:

1. A near-field optical microscope, comprising:
   a fiber optic probe having first end for coupling to a light source and having a second end that forms a light emitting tapered tip;
   a light wave guiding structure having an exposed surface positioned adjacent said tapered tip for supporting a specimen in the near field of said tapered tip, said guiding structure having a center region of a first index of refraction and having a surrounding region of a second index of refraction lower than said first index, said guiding structure defining a window of light collection that is disposed within said near field of said tapered tip and that extends over at least a portion of said exposed surface that includes said center region;
   said guiding structure further having an interface for coupling to a light detector, thereby permitting light emitted from said tapered tip and gathered through said window to be processed.

2. The microscope of claim 1 further comprising a positioning mechanism coupled to at least one of said probe and said guiding structure for adjusting the relative position of said probe and said guiding structure, whereby different portions of the specimen are selectively illuminated and examined.

3. The microscope of claim 1 further comprising a scanning mechanism coupled to at least one of said probe and said guiding structure for adjusting the relative position of said probe and said guiding structure according to a scanning pattern, whereby different portions of the specimen are selectively illuminated and examined to collect an image.

4. The microscope of claim 1 further comprising an optical detection system coupled to said interface for converting light into electrical signals.

5. The microscope of claim 1 wherein said guiding structure comprises a fiber optic cable.

6. The microscope of claim 1 wherein said guiding structure comprises a fiber optic cable dimensioned to support a single mode of guided light.

7. The microscope of claim 1 wherein said guiding structure comprises a fiber optic cable dimensioned to support multiple modes of guided light.

8. The microscope of claim 1 wherein said guiding structure comprises a planar waveguide.

9. The microscope of claim 8 wherein said planar waveguide comprises glass.

10. The microscope of claim 8 wherein said planar waveguide comprises a semiconductor material.

11. The microscope of claim 1 further comprising light detector that is integrated with said guiding structure.

12. The microscope of claim 8 wherein said planar waveguide comprises a semiconductor material and wherein said microscope further comprises light detector that is integrated with said planar waveguide.

13. The microscope of claim 1 wherein said exposed surface of said guiding structure is planar.

14. The microscope of claim 1 wherein said exposed surface is adapted to support a specimen that is directly applied to said exposed surface.

15. The microscope of claim 1 wherein said exposed surface is adapted to support a specimen in direct contact with said exposed surface.

16. The microscope of claim 1 wherein said guiding structure is disposable.

17. The microscope of claim 1 wherein said probe and said guiding structure each have a nominal width on the order of from one to one thousand (1–1000) optical wavelengths.

18. The microscope of claim 1 wherein said guiding structure is disposed in an aqueous environment.

19. The microscope of claim 1 wherein said guiding structure is disposed in a cryogenic environment.

20. The microscope of claim 1 wherein said guiding structure is an elongated fiber optic cable having a distal end remotely located from said probe, and wherein the distal defines said interface for coupling to a light detector, thereby allowing a light detector to be located at a distance from said specimen.

21. The microscope of claim 1 wherein said guiding structure is elongated and flexible for in situ placement within the body of a living organism.

22. The microscope of claim 1 wherein said probe is elongated and flexible for in situ placement within the body of a living organism.

* * * * *